(12) United States Patent
Barkan et al.

(10) Patent No.: US 7,533,819 B2
(45) Date of Patent: May 19, 2009

(54) DUAL CAMERA ASSEMBLY FOR AN IMAGING-BASED BAR CODE READER

(75) Inventors: Edward D. Barkan, Miller Place, NY (US); Mark Drzymala, Commack, NY (US); Thomas D. Bianculli, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 184 days.

(21) Appl. No.: 11/700,657

(22) Filed: Jan. 31, 2007

(65) Prior Publication Data
US 2008/0179402 A1    Jul. 31, 2008

(51) Int. Cl.
*G06K 9/18* (2006.01)
*H02P 1/00* (2006.01)

(52) U.S. Cl. ............. 235/462.09; 235/454; 235/462.01; 235/462.11; 235/462.14; 235/462.32; 235/462.43

(58) Field of Classification Search .................. 235/454, 235/462.37, 494; 382/100, 101, 107
See application file for complete search history.

(56) References Cited

U.S. PATENT DOCUMENTS 5,352,922 A * 10/1994 Barkan et al. ............... 257/459
5,635,700 A * 6/1997 Fazekas .................. 235/462.06
6,899,272 B2 * 5/2005 Krichever et al. ...... 235/462.37

OTHER PUBLICATIONS

Jacques Leconte, "Areascan Cameras: How to Choose Between Global and Rolling Shutter", Atmel Applications Journal, Winter 2006, Issue No. 6, pp. 37-39, Atmel Corporation, San Jose, CA.
Magellan 1400i Omni-Directional Imaging Bar Code Scanner. Product Listing [online]. Datalogic Scanning, Eugene, Oregon [retrieved on Apr. 9, 2007]. Retrieved from the Internet: <URL: www.scanning.datalogic.com/html/mg1400i.htm> 4 pages.

* cited by examiner

*Primary Examiner*—Thien M. Le
*Assistant Examiner*—Tuyen K Vo
(74) *Attorney, Agent, or Firm*—Tarolli, Sundheim, Covell & Tummino LLP

(57) ABSTRACT

An imaging system (20) for an imaging-base bar code reader (10) having a housing (11) and a window (17). The imaging system (20) includes a dual camera assembly (22) having a first camera assembly (24) and a second camera assembly (26) mounted within the housing (11) to image a target object (14*a*, 14*b*). The first camera assembly (24) includes a first field of view (FOV1) and the second camera assembly (26) including a second field of view (FOV2). The imaging system (20) further includes a fold mirror (36, 37) and positioned within the bar code reader housing (11) to intersect and direct the field of view of at least one of the first and second camera assemblies (24, 26) such that the first and second fields of view (FOV1, FOV2) pass through the exit window (17) and are substantially congruent exterior of the housing (11).

19 Claims, 7 Drawing Sheets

DUAL CAMERA ASSEMBLY FOR AN IMAGING-BASED BAR CODE READER

FIELD OF THE INVENTION

The present invention relates to a dual camera assembly for an imaging-based bar code reader and, more particularly, to a dual camera assembly including a first camera assembly having a rolling shutter for reading high density two dimensional (2D) bar codes over an extended range and a second camera assembly having a global shutter for swipe reading of one dimensional (1D) and 2D bar codes.

BACKGROUND ART

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Bar codes may be one dimensional (1D), i.e., a single row of graphical indicia such as a UPC bar code or two dimensional (2D), i.e., multiple rows of graphical indicia comprising a single bar code, such as a PDF417 and DataMatrix bar codes.

Systems that read bar codes (bar code readers) electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Bar code readers that read and decode bar codes employing imaging systems are typically referred to as imaging-based bar code readers or bar code scanners. Imaging systems include charge coupled device (CCD) arrays, complementary metal oxide semiconductor (CMOS) arrays, or other imaging pixel arrays having a plurality of photosensitive elements (photosensors or pixels). An illumination apparatus or system comprising light emitting diodes (LEDs) or other light source directs illumination toward a target object, e.g., a target bar code. Light reflected from the target bar code is focused through a system of one or more lens of the imaging system onto the pixel array. Thus, the target bar code within a field of view (FOV) of the imaging lens system is focused on the pixel array.

The pixel lines of the rolling shutter sensor are sequentially exposed and clocked out of the pixel array. The pixels of a global shutter sensor are simultaneously exposed and clocked out of the pixel array. In both cases the pixel values form a signal representative of a captured image frame. The analog signal is amplified by a gain factor and the amplified analog signal is digitized by an analog-to-digital converter. Decoding circuitry of the imaging system processes the digitized signals representative of the captured image frame and attempts to decode the imaged bar code.

There are two requirements that increase the difficulty of successfully utilizing an imaging-based bar code reader. The requirement is being able to successfully image and decode increasingly higher density 2D bar codes. Increasingly higher density 2D bar codes are being utilized to provide an increasing quantity of encoded data in a given size bar code area or footprint. For many items, the available area where a bar code may be imprinted is limited. Thus, if more information is desired to be encoded in a bar code, bar code density must be increased, hence the trend from 1D to 2D bar codes. Increasing the density of a 2D bar code requires increasing the number of bar code features (bars or spaces) in a given area. However, deceasing feature size leads to problems in imaging resolution and decoding of high density 2D bar codes, such at PDF 417 and DataMatrix bar codes which utilize very small feature size. For example, the size of features of typical PDF 417 bar codes found on many state drivers licenses may be on the order of 4-5 mils, while the overall size of the bar code is relatively large, e.g., over one square inch. Obviously, the higher the density of a target bar code, the more difficult it is for the imaging system to generate an image with sufficient clarity and resolution to permit successful decoding of the target bar code image. If the bar code is moved closer to the reader imaging system, a size of the field of view FOV may become too small to image the entire bar code. On the other hand, if the bar code is move away from the reader imaging system, the resolution of the imaged bar code may be inadequate to allow for successful decoding of the imaged bar code.

The second requirement is the ability to image and decode a bar code being moved through the FOV of the imaging system. This is referred to as "swipe scanning". Because of the movement of a target bar code within the FOV during imaging, the resulting image of the bar code may exhibit distortion that renders the decoding process more difficult or impossible. Generally, bar codes suitable for swipe scanning are lower resolution 1D bar codes which are easier to image and decode.

Characteristics of imaging systems that provide for the high resolution imaging necessary with high density 2D bar codes are different and often at odds with the characteristics of imaging systems that provide for successful imaging of moving, as opposed to stationary, bar codes. What is needed is an imaging-based bar code reader that includes an imaging system that provides for successful imaging of both high density bar codes and moving bar codes. What is also needed is an imaging-based bar code reader that provides such an imaging system in a housing that is capable of use in both a stationary mode or fixed position wherein a target bar code may be swiped or moved through the FOV of the imaging system and in a hand-held or portable mode wherein the reader may be picked up and moved about by a user to image and decode target bar codes on stationary objects, e.g., products on a shelf in a store or warehouse.

SUMMARY

In one aspect, the present invention features an imaging system for use in an imaging-based bar code reader including a housing having a window. The imaging system includes a first camera assembly and a second camera assembly mounted within the housing to image a target object, the first camera assembly including a first field of view and the second camera assembly including a second field of view. The imaging system further including a fold mirror and positioned within the bar code reader housing to intersect and direct the field of view of at least one of the first and second camera assemblies such that the first and second fields of view pass through the exit window and are substantially congruent exterior of the housing. The first camera assembly includes a two dimensional sensor array having a global shutter pixel structure for imaging a target bar code swiped through the first field of view and the second camera assembly includes a two dimensional sensor array adapted for high resolution imaging of a target bar code comprising a high density one or two dimensional bar code positioned in the second field of view.

These and other objects, advantages, and features of the exemplary embodiments are described in detail in conjunction with the accompanying drawings.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which.

DETAILED DESCRIPTION

Figure 1:
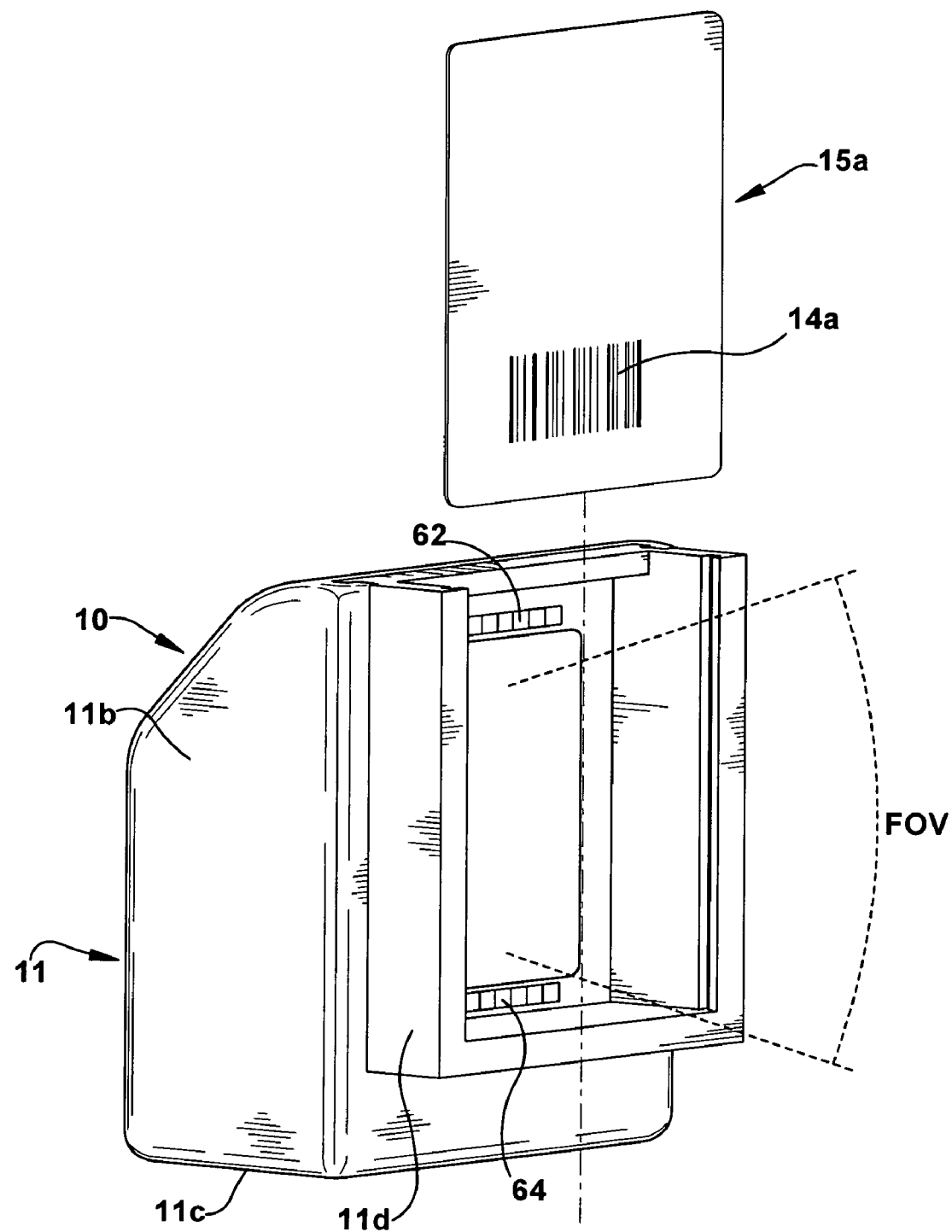
FIG. 1 is a schematic perspective view of an exemplary embodiment of an imaging-based bar code reader of the present invention including an item swipe guide.

An exemplary embodiment of an imaging-based bar code reader of the present invention is shown schematically at 10 in FIGS. 1-4. The bar code reader 10 is capable of reading, that is, imaging and decoding both 1D and 2D bar codes, such as a 1D bar code shown at 14a and a 2D bar code shown at 14b. Additionally, the reader 10 is also capable of capturing images and signatures. The reader 10 utilizes an imaging system 20 for imaging the target bar codes 14a, 14b and a decoding system 40 for decoding an image 14' of the target bar code 14a, 14b.

Advantageously, to avoid performance tradeoffs inherent in the design of a camera assembly for the imaging system wherein it is desired to successfully image both high density 2D bar codes 14b that are present in a stationary or substantially stationary manner to the reader 10 and to image lower resolution 1D bar codes that are moved or swiped through a field of view (FOV) of the imaging system 20, the present invention provides for a dual camera assembly 22, described below.

The bar code reader 10 includes a housing 11 supporting the imaging system 20 and the decoding system 40 within an interior region 11a of the housing 11. An upper or scanning head portion 11b of the housing 11 supports a transparent window 17 through which reflected illumination from the target bar code 14a, 14b is received by the imaging system 20. In the Figures, the window 17 is vertically oriented, that is, parallel to the y axis. However, it should be recognized that the window 17 is not necessarily parallel to the y axis but may deviate from a strict vertical orientation.

The bar code reader 10 of this exemplary embodiment is a hands-free reader including the generally upright housing 11 having a flat base portion 11c that is adapted to be placed on a counter or tabletop wherein an operator presents a target bar code 14a, 14b to the reader for reading, that is, imaging and decoding the target bar code 14. The reader 10 may be used in two modes: imaging and decoding target high density bar codes (such as 2D bar code 14a) affixed to target objects (such as object 15a) that are stationary or substantially stationary with respect to the FOV of the imaging system 20; and imaging and decoding low density bar codes (such as 1D bar code 14b) affixed to target objects (such as object 15b) that are moved or swiped through a field of view FOV of the imaging system 20.

To aid in imaging an object such as a credit card or drivers' license 15b swiped through the FOV of the imaging system, the reader housing 11 may include a swipe guide 11d to insure that the object 15b and, therefore, the target bar code 14b is moved linearly through the FOV. Obviously, the housing 11 may equally well be used without a swipe guide.

Figure 2:
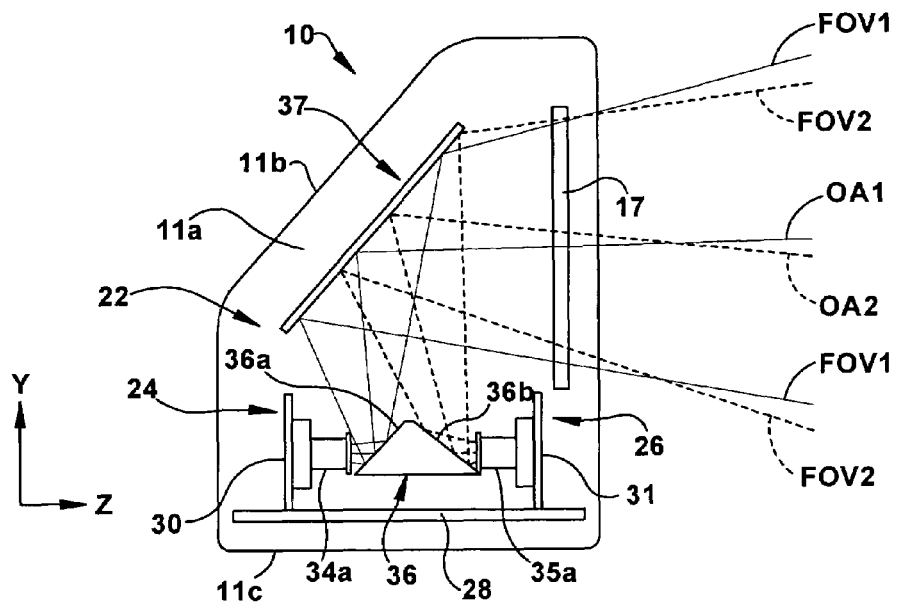
FIG. 2 is a schematic sectional view of the imaging-based bar code reader of FIG. 1 with the guide removed.
Figure 3:
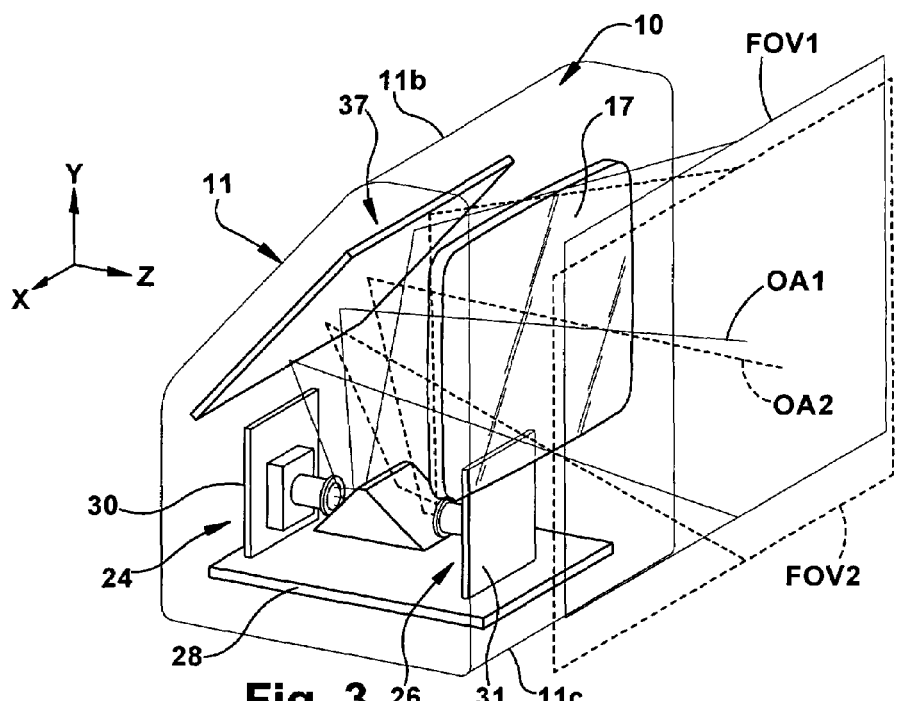
FIG. 3 is a schematic perspective cut away view of the imaging-based bar code reader of FIG. 1.
Figure 4:
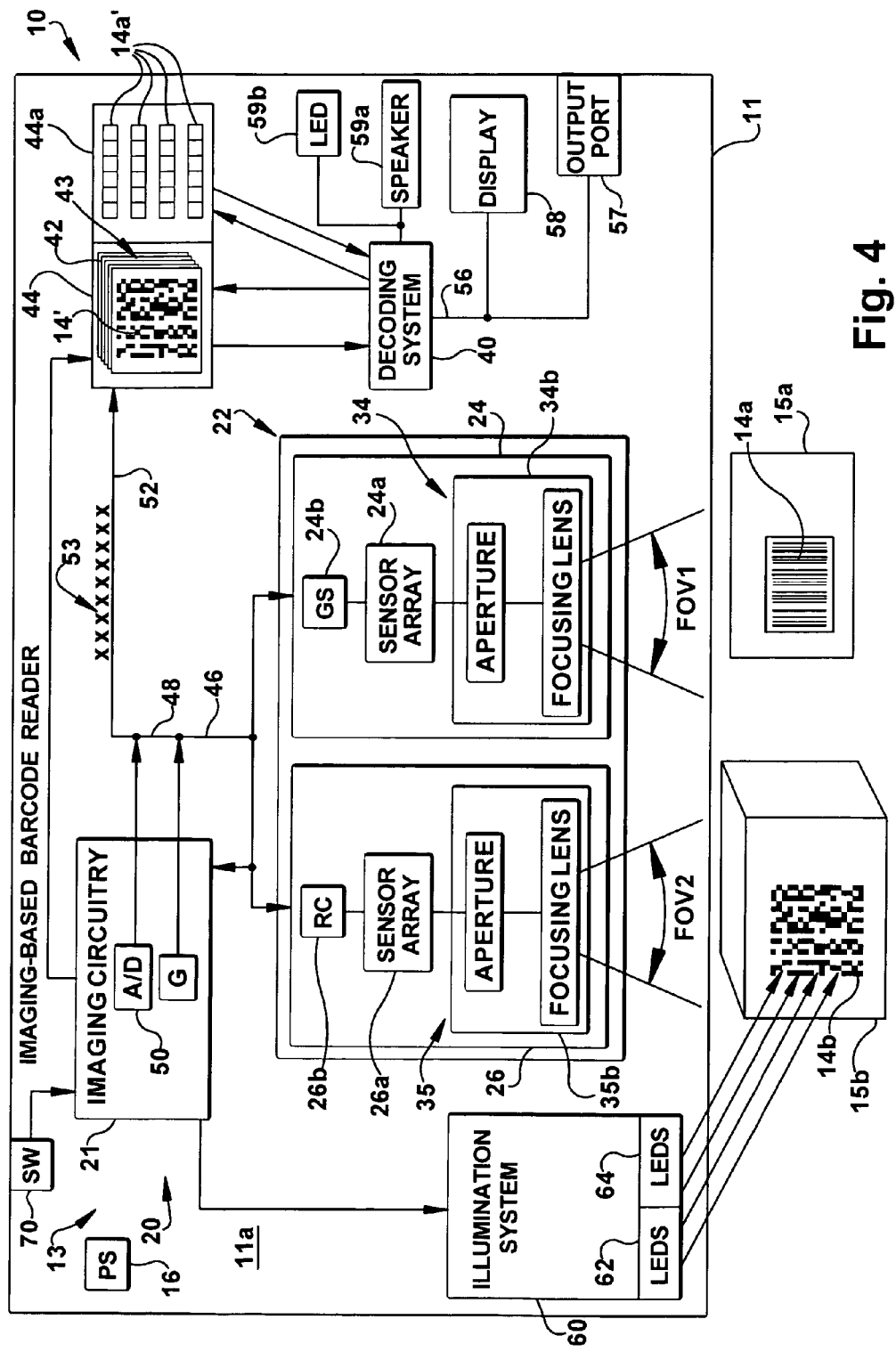
FIG. 4 is a block circuit diagram of the imaging-based bar code reader of FIG. 1.

As is best seen in FIGS. 2 and 3, the bar code reader housing 11 defines the interior area 11a. Disposed within the interior area 11a is bar code reader circuitry 13 including the imaging and decoding systems 20, 40 and an illumination assembly 60 which, when enabled, directs illumination through the transparent window 17 and onto the target bar code 14a, 14b. The bar code reader circuitry 13 is electrically coupled to a power supply 16, which may be in the form of an on-board battery or a connected off-board power supply. If powered by an on-board battery, the reader 10 may be a stand-alone, portable unit. If powered by an off-board power supply, the reader 10 may have some or all of the reader's functionality provided by a connected host device.

The imaging system 20, when enabled, during an exposure or integration period, captures an image frame 42 of the field of view FOV of the imaging system. During an imaging session to read a target bar code 14a, 14b, the imaging process is repeated to capture a series of image frames 43 as the target bar code 14a, 14b is moved through the imaging system field of view FOV. The decoding system 40 sequentially analyzes each image frame 42 of the series of image frames 43 and attempts to decode decodable portions of the imaged bar code 14'. The decoded portions 14a' of the imaged bar code 14' are stored in a buffer memory 44a.

The analog image signal 46 represents a sequence of photosensor voltage values, the magnitude of each value representing an intensity of the reflected light received by a photosensor/pixel of one of the sensor arrays 24a, 26a (discussed below) during an exposure/integration period. The analog signal 46 is amplified by a gain factor, generating an amplified analog signal 48. The imaging circuitry 24 further includes an analog-to-digital (A/D) converter 50. The amplified analog signal 48 is digitized by the A/D converter 50 generating a digitized signal 52. The digitized signal 52 comprises a sequence of digital gray scale values 53 typically ranging from 0-255 (for an eight bit processor, i.e., $2^8=256$), where a 0 gray scale value would represent an absence of any reflected light received by a pixel (characterized as low pixel brightness) and a 255 gray scale value would represent a very intense level of reflected light received by a pixel during an integration period (characterized as high pixel brightness).

The digitized gray scale values 53 of the digitized signal 52 are stored in the memory 44. The digital values 53 corresponding to a read out of the pixel array 28 constitute the image frame 42, which is representative of the image projected by the focusing lens (discussed below) onto the pixel array 24a, 26a during an exposure period. If the field of view FOV includes the target bar code 14, then a digital gray scale value image 14' of the target bar code 14 would be present in the image frame 42.

The decoding circuitry 40 then operates on the digitized gray scale values 53 of the image frame 42 and attempts to decode any decodable part or portion of that image frame 42 that is representative of a part or portion the imaged target bar code 14'. The decoded portions 14a' of the imaged target bar code 14' are stored in the buffer memory 44a.

Obviously, if a single image frame 42 includes a decodable portion that is representative of or corresponds to the entire imaged target bar code 14' and thereby allows complete decoding of the target bar code in one image frame 42, the decode is complete and a signal for successful decode is generated to activate the speaker 59a and/or LED indicator 59b to let the operator know that decoding of the target bar code 14 has been completed. However with high density bar codes, such as bar code 14a, this will rarely occur because of PPM (pixel per module) limitations. Thus, a series of images 43 may need to be obtained, analyzed and partial decodes combined or stitched together utilizing a stitching method to achieve a complete decode. A suitable stitching method is disclosed in U.S. patent application Ser. No. 11/395,596, filed Mar. 31, 2006 and entitled "Imaging-Based Bar Code Reader Utilizing Stitching Method and Swipe Guide". U.S. patent application Ser. No. 11/395,569 is assigned to the assignee of the present invention and is incorporated herein in its entirety by reference.

If the decoding is successful, decoded data 56, representative of the data/information coded in the bar code 14 is then output via a data output port 57 and/or displayed to a user of the reader 10 via a display 58. Upon achieving a good "read" of the bar code 14, that is, the bar code 14 was successfully imaged and decoded, a speaker 59a and/or an indicator LED 59b is activated by the bar code reader circuitry 13 to indicate to the user that the target bar code 14 has successfully read, that is, the target bar code 14 has been successfully imaged and the imaged bar code 14' has been successfully decoded.

Imaging System 20

The bar code reader imaging system 20 includes the dual camera assembly 22 which includes two imaging camera modules 24, 26.

Figure 9:
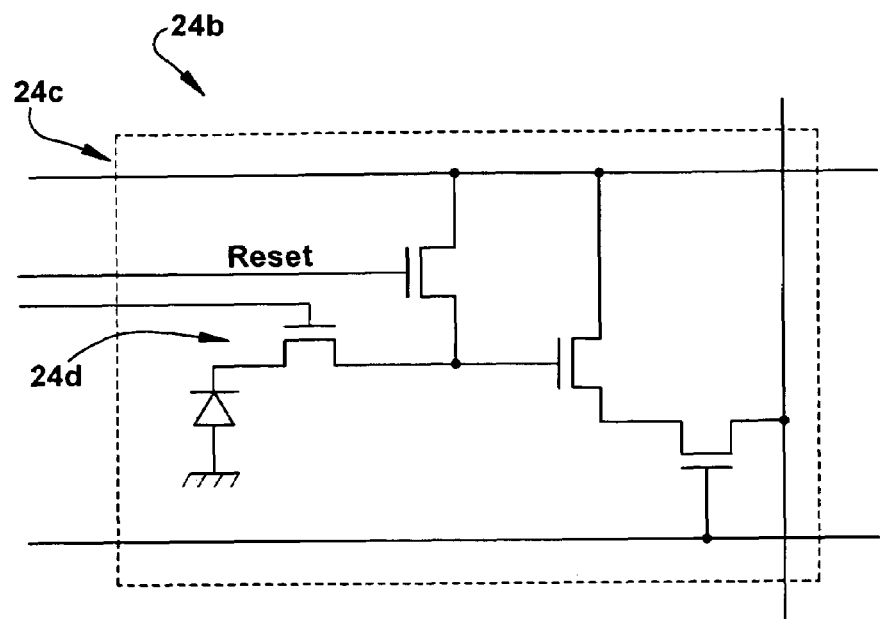
FIG. 9 is a schematic circuit diagram of a pixel of a sensor array utilizing a rolling shutter pixel readout structure.

The first camera module or assembly 24 includes a 2D sensor array 24a utilizing a global shutter pixel readout structure 24b adapted minimize blurring and image distortion when imaging a 1D target bar code (such as bar code 14a) when the target bar code is swiped through a field of view (FOV1) of the first camera assembly 24. In a global shutter pixel readout structure 24b, the following readout method is utilized, all lines or rows of the sensor array 24a (or a region of interest of the sensor array 24a) are reset and then exposed simultaneously for a specified time. At the end of the exposure/integration time, the accumulated charge on each pixel of the array 24a (or region of interest of the array 24a) is transferred immediately to an adjacent storage area or memory zone 24d (FIG. 9) to await read-out. The pixel charge values are then read out row-by-row from the storage area 24d, building the image frame.

The use of an intermediate storage area 24d reduces the gradual overexposure that can occur down the image when rows are read out directly from the active area of the sensor. The global shutter method results in a simultaneous exposure of all pixels. However, the global shutter readout structure 24b substantially eliminates blurring or image distortion that would be characteristic of a rolling shutter pixel read out method if the integration time is too short in comparison with the read out time. In the global shutter pixel structure 24b, the storage or memory area 24d must be provided for each pixel, this requires an additional transistor compared to the rolling shutter pixel structure. A simplified circuit diagram for the rolling shutter pixel structure for a representative pixel is shown generally at 26c in FIG. 9.

A discussion and comparison of global and rolling shutter readout structures may be found in an article entitled "Areascan Cameras: How to Choose Between Global and Rolling Shutter" by Jacques Leconte, Camera & Application Development Manager, Atmel, appearing in *Atmel Applications Journal,* Issue 6, Winter 2006, pages 37-39, Atmel Corporation, San Jose, Calif. 95131 (www.atmel.com). The aforesaid Atmel Applications Journal article is incorporated herein in its entirety by reference.

The second camera module or assembly 26 includes a 2D mega pixel sensor array 26a adapted to provide high resolution imaging of 2D target bar codes (such as bar code 14b) having high density bar code features, for example, successfully imaging (to permit decoding) of bar code features on the order of 4-5 mils over an extended range. Preferably, the second camera module 26 utilizes a rolling shutter pixel readout structure 24b. In the rolling shutter pixel readout structure 26b, integration time occurs just before the readout of each line of the sensor array. An image frame of a field of view FOV2 of the camera assembly 24 is built from reading out successive lines of the sensor array 26a.

Figure 10:
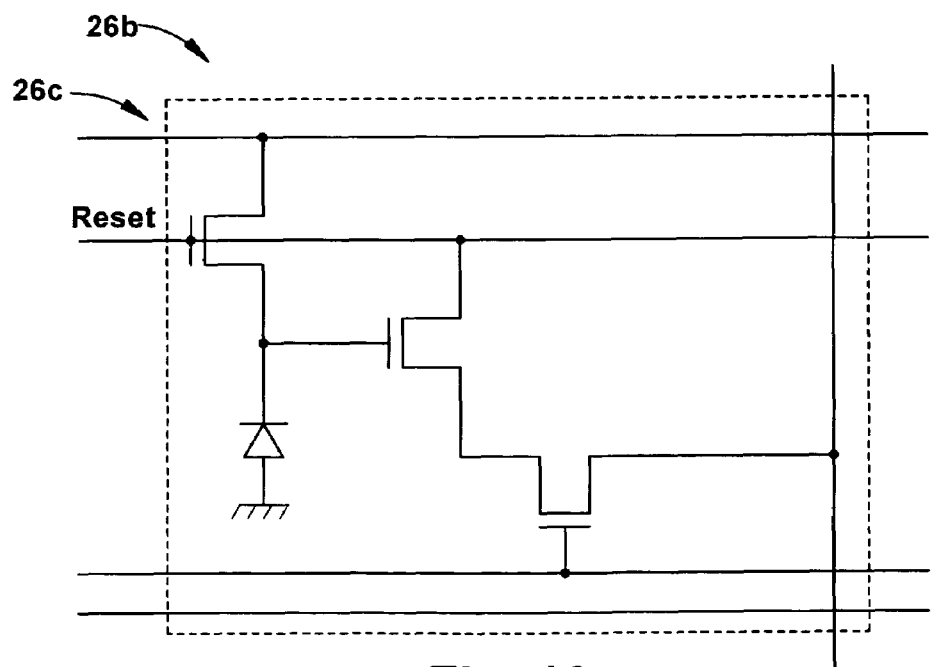
FIG. 10 is a schematic circuit diagram of a pixel of a sensor array utilizing a global shutter pixel readout structure.

In the rolling shutter readout structure or method, readout of a pixel resets the pixel charge. Depending on the required speed, the chosen integration time might be shorter or longer than the frame readout time. The rolling shutter structure 26b is easy to implement and requires only three transistors at the pixel level allowing a good signal to noise ratio. A simplified circuit diagram for the rolling shutter pixel structure for a representative pixel is shown generally at 26c in FIG. 10. The rolling shutter pixel readout structure 26b is also tolerant if wide aperture lens are employed in the camera module 26.

Looking at FIGS. 1-4, the reader 10 provides the dual camera assembly 22 in the compact housing 11. The first and second camera modules 24, 26 are supported from a base printed circuit (PC) board 28 that is positioned substantially horizontally (parallel to the x-z plane (FIG. 3)) within the housing interior region 11a. The horizontal PC board 28 may be populated with bar code reader circuitry 13 including imaging system circuitry 21. As can best be seen in FIGS. 2 and 3, the camera modules 24, 26 include PC boards 30, 31 which are affixed to and extend orthogonally from the horizontal PC board 28. Mounted to the respective PC boards 30, 31 are the 2D sensor arrays 24a, 26a. The sensor arrays 24a. 26a are secured to their respective PC boards 30, 31 in parallel direction for stability. As can best be seen in FIG. 3, to insure that the field of view FOV1, FOV2 are congruent outside the housing 11, the camera modules 24, 26 are substantially aligned in the z direction, that is, substantially aligned along the optical axis OA1, OA2 of their respective lens assemblies.

The respective sensor arrays 24a, 26a are overlaid by lens assemblies 34, 35. The lens assemblies 34, 35 include lens holders 34a, 35a which support imaging lens 34b, 35b. Each imaging lens 34b, 35b may include one or more focusing lens and apertures. The lens holders 34a, 35a are typically made of metal and may be stationary (fixed focus camera assembly) or may be movable horizontally along a path of travel under the control of the imaging circuitry 21 to permit a variable focus camera assembly. The lens assemblies 34, 35 define respective optical axis OA1, OA2 and fields of view FOV1, FOV2. The lens assemblies 34, 35 receive and focus reflected light from the respective fields of view FOV1, FOV2 onto the respective senor arrays 24a, 26a. The lens holders 34a, 35a extend from housings 34c, 35c which overlie and protect the sensor arrays 24a, 24b from ambient illumination. The imaging lens 34b, 35b focus light reflected from the target bar code 14a, 14b through an aperture onto the respective sensor arrays 24a, 26a. Thus, the imaging lens 34b, 35b focus an image of the target bar code 14a, 14b (assuming it is within the field of view) onto the array of pixels. The field of view FOV1, FOV2 of the respective imaging lens 34b, 35b includes both a horizontal and a vertical field of view comprising a generally rectangular field of view as can be seen in FIG. 3.

With regard to the first camera module 24, the 2D sensor array 32 is preferably a video graphics array (VGA) sensor or a sensor that has slightly higher resolution than a VGA sensor. Typical array size would be on the order of 640×480 pixels. The smaller array size of the VGA sensor makes extra memory storage required by the global shutter pixel readout structure 26b less costly and reduces space requirements.

With regard to the second camera module 26, the 2D sensor array 26a comprises a two dimensional (2D) mega pixel array such as charged coupled device (CCD), a complementary metal oxide semiconductor (CMOS), or other imaging pixel array. A typical size of the sensor array 26a being on the order of 1280×1024 pixels.

Circuitry associated with the imaging and decoding systems 20, 40, including the imaging circuitry 21, may be embodied in hardware, software, firmware, electrical circuitry or any combination thereof and may be disposed within, partially within, or external to the dual camera assembly 22.

Two fold mirrors 36, 37 are positioned within the housing interior 11a in a "rooftop" configuration to intersection and reflect or direct the respective optical paths or fields of view FOV1, FOV2 through the window 17. The fold mirror 36 includes angled mirror portions 36a, 36b. The angled mirror portions 36a, 36b may be orthogonal or at other angles that best fit in the housing 11. The mirror portions 36a, 36b may be comprised of two pieces of mirrored glass or can be molded out of a single piece of plastic, coated with a reflective layer. Use of a single piece of plastic for the mirror portions 36a, 36b will allow the optical axis of the portions to be closer together to minimize parallax and will assure consistent angles in manufacturing the dual camera assembly 22. Two pieces of glass with mitered edges can also be used for the mirrored portions 36a, 36b wherein the mitered edges will minimize spacing between the optical axis.

As can best be seen in FIGS. 2 and 3, the mirror portion 36a is positioned to intersect and direct the field of view FOV1 of camera module 24 toward the mirror 37 while the mirror portion 36b is positioned to intersect and direct the field of view FOV2 of the camera module 26 toward the mirror 37. The mirror 37 is positioned to intersect and direct the fields of view FOV1, FOV2 toward and through the window 17.

The camera modules 24, 26 and the mirrors 36, 37 are constructed and positioned such that the fields of view are overlapping upon exiting the window 17 and are substantially congruent exterior of the housing 11. Stated another way, the mirrors 36, 37 allow the camera modules 24, 26 to look out the exit window 17 with minimal parallax or offset. This is advantageous because it avoids the need for users to present different kinds of target bar codes to the reader 10 differently. This makes the reader 10 intuitive to operate, thus, avoiding the need for special training of users.

The illumination system 60 includes a first illumination assembly 62 comprising one or more LEDs that are actuated during operation of the first and second camera assemblies 24, 26 to provide necessary illumination of the target bar codes 14a, 14b for imaging purposes. To make the illumination less visible, infa-red or near infra-red LEDs may be utilized. Alternatively, there may be first and second illumination assemblies 62, 64 wherein the first illumination assembly 62 comprising one or more LEDs having a first range of illumination wavelengths is actuated during operation of the first camera assembly 24 and the second illumination assembly 64 comprising one or more LEDs having a second range of illumination wavelengths are actuated during operation of the second camera assembly 26. In FIG. 1, two illumination assemblies 62, 64 are shown, each illumination assembly would have its wavelength range matched to the camera characteristics to optimize imaging. Another possibility would be to illuminate the illumination assemblies 62, 64 alternately with operation of either camera module 24, 26 so as to minimize problems with specular reflection or to enable reading of low contrast bar codes that may be easier to image using one of the two ranges of wavelengths. For example, bar codes with red bars on a white background may be advantageously imaged with white or green wavelength illumination but may be more difficult to image with red wavelength illumination (around 670 nanometers (nm.)). Yet another possibility would be to use ultra-violet illumination for one illumination assembly 62, 64, if one of the camera modules will be used for imaging bar code or signature indicia that is printed with luminous ink.

Advantageously, the reader 10 may include an automatic way to change reader functionality. For example, the housing 11 may include a magnetic switch or an accelerometer switch 70 that would detect when the housing 11 is placed a counter or is positioned in a stand to be used in a hands-free mode, as opposed to being picked up from the counter or stand and used in the hand-held mode. The imaging circuitry 21 would monitor the state of the magnetic switch 70 to, for example, cause the first camera module 24 to be activated more frequently when the reader 10 is used in the hands-free mode and cause the second camera module 26 to be activated more frequently when the reader 10 is used in a hand-held mode. Additionally or alternatively, the illumination system 60 may similarly controlled by the imaging circuitry 21 to activate/deactivate illumination assemblies 62, 64 in accordance with the state of the magnetic switch 70 and mode of operation.

Operation of Dual Camera Assembly 22

Operation of the dual camera assembly 22 will typically involve predominantly swipe scanning of 1D bar codes, such as the bar code 14a by swiping the card 15a through the guide 11d, and occasional reading of 2D bar codes, such as the bar code 14b by moving the reader 10 to the object 15b or moving the object 15b adjacent to the guide 11d for imaging. As such, the reader imaging circuitry 21 continuously operates the first camera module 24 of the dual camera assembly 24.

If the imaging and decoding systems 20, 40 detect a 2D bar code that cannot be read, such as a high density 2D PDF bar code 14b, the first camera module 24 is turned off and the second camera module 26 is activated until the 2D bar code 14b is successfully imaged and decoded. Upon successful decoding, the second camera module 26 is turned off and the first camera module 24 is turned back on. Detection of a 2D bar code, such as a PDF bar code, may be identified by its start and stop characters which can be recognized even if the small bar code elements cannot be resolved.

Alternatively, if the decoding system 40 is robust enough, both the first and second camera modules 24, 26 may be operated continuously and the decoding system would select the appropriate image for successful decoding of a target bar code.

Yet another alternative operating method would involve using the reader 10 as a point of sale scanner which is linked to a host computer. In this situation, the host computer would communicate a signal to the reader imaging circuitry 21 informing the reader when 1D bar codes are expected to be scanned and when 2D bar codes are expected to be scanned, the imaging circuitry 21 would actuate the first and second camera modules 24, 26 appropriately.

Another application for the reader 10 would be a situation where the first camera module 24 is used for swipe scanning and the second camera module 26 would be used for image capture, e.g., in a pharmacy, the first camera module 24 would be used for swipe scanning a produce with a 1D UPC bar code, while the second camera module 26 would be used for signature/image capture of a prescription document. For such an application, the lens assembly 34 of the first camera assembly 24 would be focused relatively close up to the reader, i.e., using the swipe 11*d*, while the lens assembly 35 of the second camera assembly 26 would be focused at a greater distance so as to be able to clearly resolve an 8½"×11" document.

Another possibility contemplated by the present invention is to use a monochrome sensor array for the 2D sensor array 24*a* of the first camera module 24 for swipe scanning and a color sensor array for the 2D sensor array 26*a* of the second camera module 26 for image capture applications. In this case, white illumination produced by the LEDs of the illumination system 60 would be appropriate. Alternately, the illumination system 60 may be deactivated during capturing of color images by the second camera module 26 so that ambient light may be used for illumination. Advantageously, the reader 10 of the present invention may easily be adapted to a wide variety of applications by using different focusing parameters and different illumination wavelengths while still maintaining the basic structure described above.

Second Exemplary Embodiment

Figure 5:
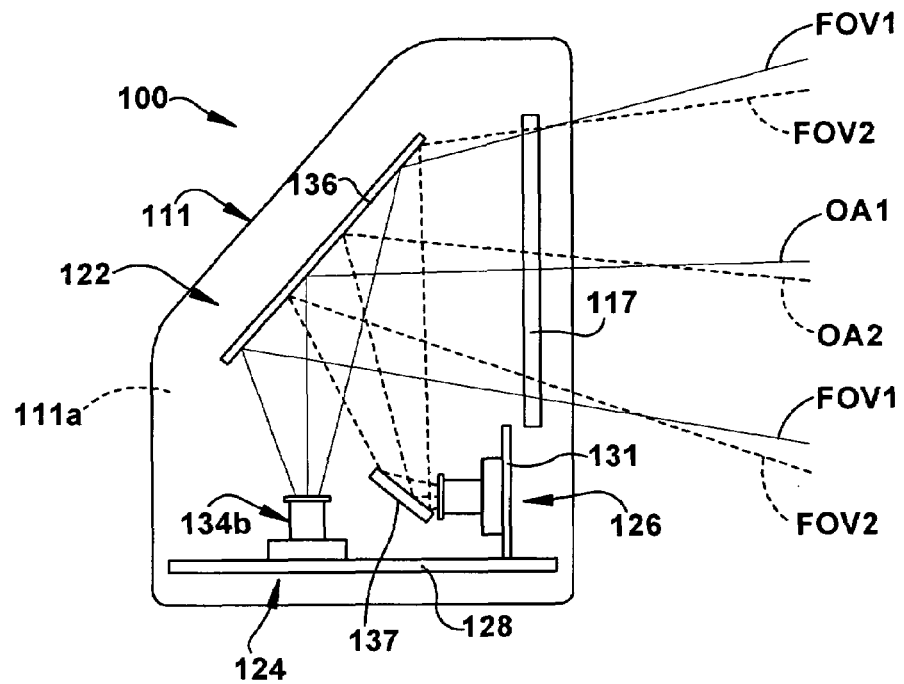
FIG. 5 is a schematic sectional view of a second exemplary embodiment of an imaging-based bar code reader of the present invention.

A second exemplary embodiment of an imaging-based bar code reader of the present invention is shown schematically at 100 in FIG. 5. The reader 100 includes a dual camera assembly 122 including a first camera module 124 having a first optical path or field of view FOV11 and a second camera module 126 having a second optical path or field of view FOV12. The first camera module 124 (which may be either the global shutter camera or the mega pixel camera) is mounted to a horizontally-oriented base PC board 128. The second camera module 126 is mounted on a PC board 131 that extends vertically from the base PC board 128.

The optical paths OA11, OA12 of the first and second camera modules 124, 126 within an interior region 111*a* of the housing 111 are different than in the first embodiment. The first camera module 124 is positioned in the housing 111 such that its field of view FOV11 intersects a larger first fold mirror 136 and is redirected to pass through the transparent window 117 and extend toward a target object. The second camera assembly 126 is aimed at a small fold mirror 137 in proximity to the imaging lens 134*b* of the first camera assembly 124 such that the field of view FOV12 of the second camera module 126 intersects the first fold mirror 136 and passes through the window 117. As in the first embodiment, exterior of the housing 111 the two fields of view FOV11, FOV12 overlap and are substantially congruent. This configuration of the dual camera assembly 122 minimizes parallax and may fit in some housing shapes more easily than the first embodiment.

Third Exemplary Embodiment

Figure 6:
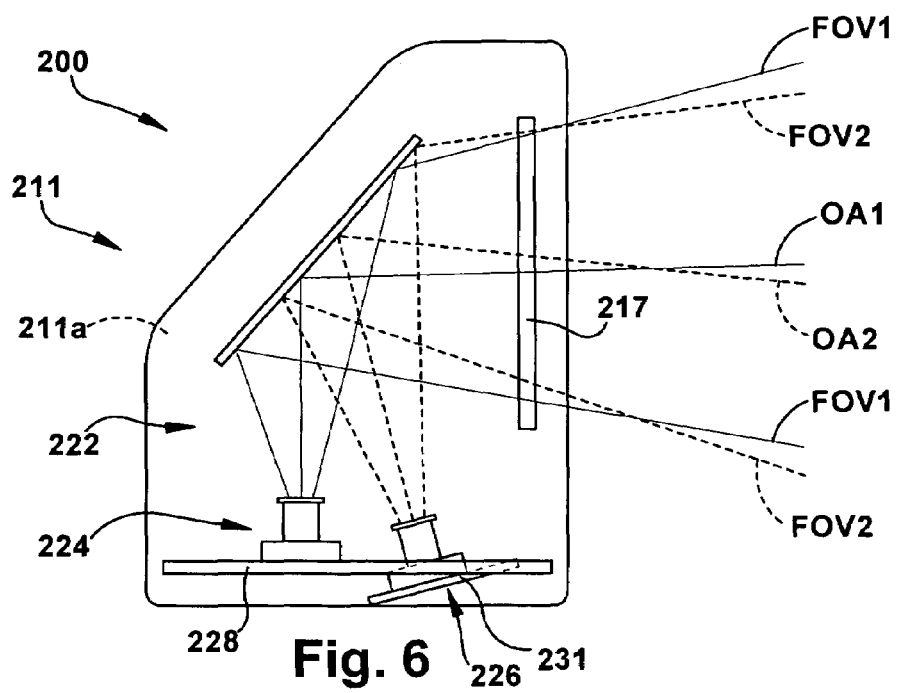
FIG. 6 is a schematic sectional view of a third exemplary embodiment of an imaging-based bar code reader of the present invention.

A third exemplary embodiment of an imaging-based bar code reader of the present invention is shown schematically at 200 in FIG. 6. The reader 200 includes a dual camera assembly 222 including a first camera module 224 having a first optical axis OA21 and first field of view FOV21 and a second camera module 226 having a second optical axis OA22 and second field of view FOV22. The first camera module 224 (which may be either the global shutter camera or the mega pixel camera) is mounted to a horizontally-oriented base PC board 228. The second camera module 226 is mounted on a PC board 231 that is at an acute angle with respect to the base PC board 228 such that the second optical axis OA22 is at an acute angle with respect to the first optical axis OA21.

This configuration eliminates the need for two fold mirrors. As can be seen, a single fold mirror is positioned to intersect and redirect the optical paths OA21, OA22 of the first and second camera modules 224, 226 within an interior region 211*a* of the housing 211. The respective fields of view FOV21, FOV22 are reflected to pass through the transparent window 217 and extend toward a target object. As in the first embodiment, exterior of the housing 211, the two fields of view FOV21, FOV22 overlap and are substantially congruent. This configuration of the dual camera assembly 222 minimizes parallax and may fit in some housing shapes more easily than the first embodiment.

Fourth Exemplary Embodiment

Figure 7:
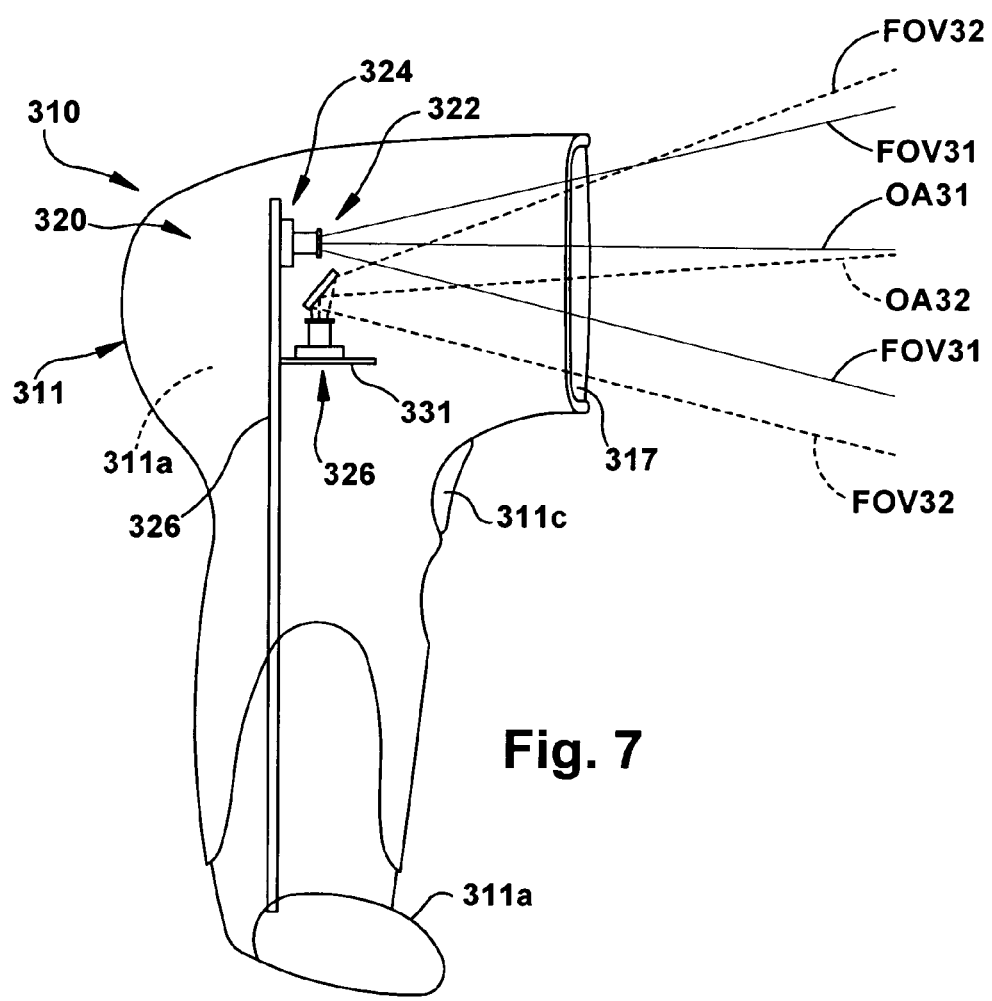
FIG. 7 is a schematic side sectional view of the fourth exemplary embodiment of an imaging-based bar code reader of the present invention including a pistol-grip shaped housing.
Figure 8:
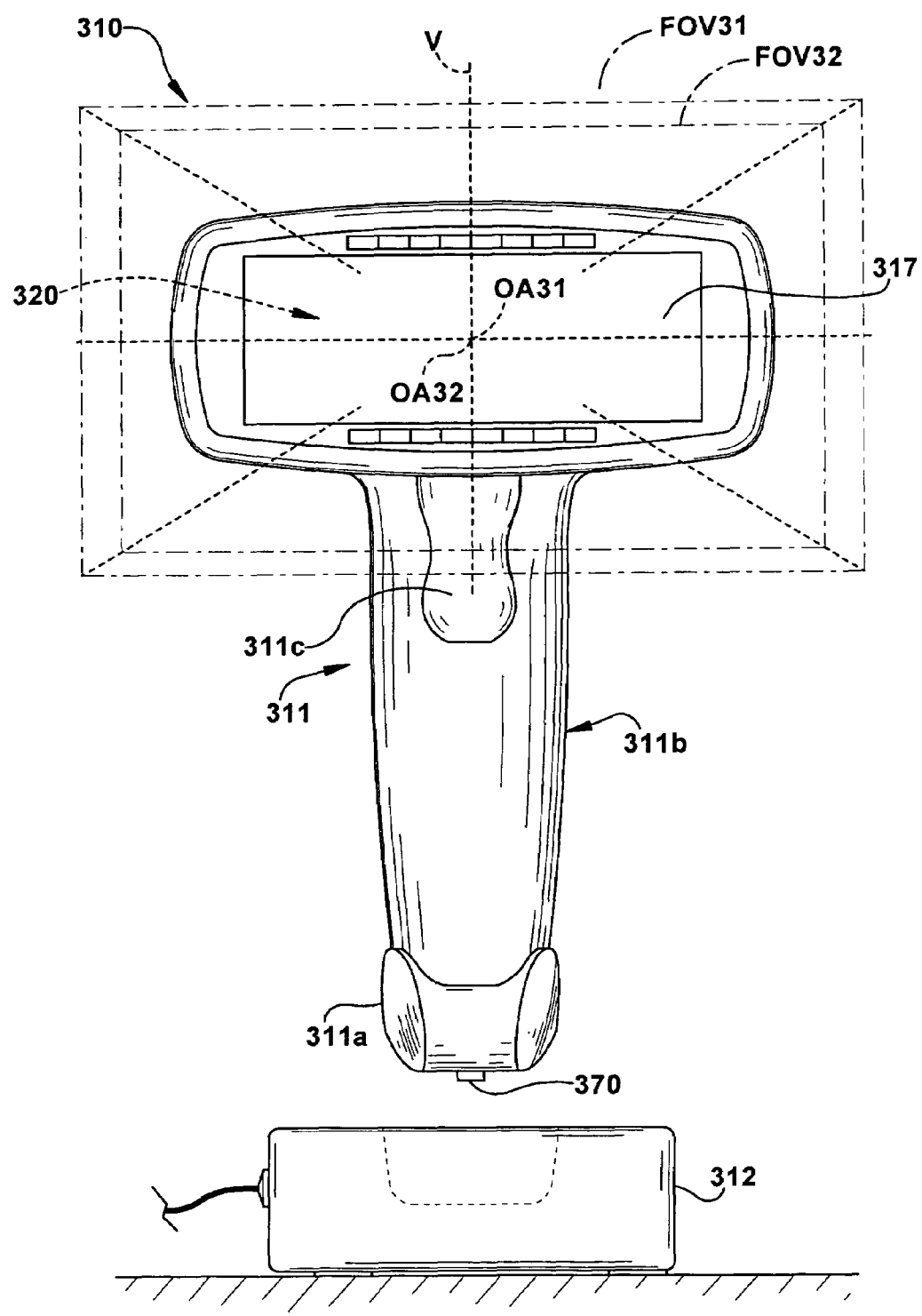
FIG. 8 is a front elevation view of the imaging-based bar code reader of FIG. 7.

A fourth exemplary embodiment of an imaging-based bar code reader of the present invention is shown generally at 310 in FIGS. 7 and 8. In this embodiment, the housing 311 is a pistol-shaped housing that is adapted to be used in a hands-free mode when inserted in a stand or docking station 312 that accepts a lower or boot 311*a* of a handle portion 311*b* of the housing 311. The reader 310 is also advantageously adapted to be used in a hand-held or portable mode in which it may be removed from the stand 312 by a user and carried around a facility such as a store or warehouse to read bar codes on products stocked on shelves or pallets.

When used in a hand-held mode, a trigger 311*c* is provided to allow the user to actuate the imaging system 320. A bottom of the boot 311*a* may include a magnetic switch 370 (such as the magnetic switch 70 described above with respect to the first embodiment) that changes states when removed from the stand 312 to let the imaging system 320 know whether the reader 310 is being used in a hand-free or hand-held mode and appropriately control actuation of the first and second camera assemblies 324, 326, as described above, depending on the mode of use. The trigger 311*c* may be enabled when the reader 310 is lifted off the stand 312 and the magnetic switch 370 changes state. When the reader 310 sits in the stand 312, the imaging system 320 would perform continuous image capture for hands free scanning.

The reader 300 includes a dual camera assembly 322 including a first camera module 324 having a first optical path or field of view FOV31 and a second camera module 326 having a second optical path or field of view FOV32. The first camera module 324 (which may be either the global shutter camera or the mega pixel camera) is mounted to a vertically-oriented base PC board 328. The second camera module 326 is mounted on a horizontal PC board 331 that is at a right angle with respect to the base PC board 328.

The configuration eliminated the need for two fold mirrors. As can be seen, a single fold mirror is positioned to intersect and redirect the optical paths of the first and second camera modules 324, 326 within an interior region 311a of the housing 311. The respective fields of view FOV31, FOV32 are reflected to pass through the transparent window 317 and extend toward a target object. As in the first embodiment, exterior of the housing 311, the two fields of view FOV31, FOV32 overlap and are substantially congruent and the optical axis OA31, OA32 are substantially aligned. This configuration of the dual camera assembly 322 minimizes parallax and is adapted to fit in the pistol-grip housing 311.

While the present invention has been described with a degree of particularity, it is the intent that the invention includes all modifications and alterations from the disclosed design falling with the spirit or scope of the appended claims.

We claim:

1. An imaging system for use in an imaging-based bar code reader including a housing having a window, the imaging system comprising:
    a dual camera assembly including a first camera assembly and a second camera assembly mounted within the housing for imaging, the first camera assembly including a first field of view and the second camera assembly including a second field of view;
    the imaging system further including a fold mirror and positioned within the housing to intersect and direct the field of view of at least one of the first and second camera assemblies such that the first and second fields of view pass through the window and are substantially congruent exterior of the housing;
    the first camera assembly including a two dimensional sensor array having a global shutter pixel structure for imaging a target bar code swiped through the first field of view; and
    the second camera assembly including a two dimensional sensor array adapted for high resolution imaging of a target bar code comprising a high density two dimensional bar code positioned in the second field of view.

2. The imaging system of claim 1 further including a second fold mirror having a first reflective surface and a second reflective surface which is at an angle with respect to the first reflective surface, the second fold mirror positioned such that the first field of view intersects the first reflective surface such that the first field of view is directed to intersect the first fold mirror and the second field of view reflects the second reflective surface such that the second field of view is directed to intersect the first fold mirror.

3. The imaging system of claim 2 wherein the first fold mirror directs the first and second fields of view through the window.

4. The imaging system of claim 1 wherein an optical axis of the first camera assembly is substantially aligned with an optical axis of the second camera assembly.

5. The imaging system of claim 1 wherein the first camera assembly is mounted to a first printed circuit board and the second camera assembly is disposed such that an optical axis of the first camera assembly is at an acute angle with respect to an optical axis of the second camera assembly, the first and second fields of view intersecting the first fold mirror.

6. The imaging system of claim 1 further including a second fold mirror positioned to intersect one of the first and second fields of view and direct the one of the first and second fields of view to intersect the first fold mirror.

7. The imaging system of claim 1 wherein the first camera assembly is mounted to a first printed circuit board and the second camera assembly is mounted to a second printed circuit board, an optical axis of the first camera assembly being substantially orthogonal to an optical axis of the second camera assembly.

8. An imaging-based bar code reader comprising:
    a housing having a window;
    an imaging system for imaging a target bar code including a dual camera assembly having first and second camera assemblies mounted within the housing to image a target bar code, the first camera assembly including a first field of view and the second camera assembly including a second field of view; and
    the imaging system further including a fold mirror positioned within the housing to intersect and direct the field of view of at least one of the first and second camera assemblies such that the first and second fields of view pass through the window and substantially overlap exterior of the housing;
    the first camera assembly including a two dimensional sensor array utilizing a global shutter pixel readout structure for imaging a one dimensional target bar code swiped through the first field of view; and
    the second camera assembly including a two dimensional sensor array for imaging of a target bar code comprising a high density two dimensional bar code positioned in the second field of view.

9. The imaging-based bar code reader of claim 8 further including a second fold mirror having a first reflective surface and a second reflective surface which is at an angle with respect to the first reflective surface, the second fold mirror positioned such that the first field of view intersects the first reflective surface such that the first field of view is directed to intersect the first fold mirror and the second field of view reflects the second reflective surface such that the second field of view is directed to intersect the first fold mirror.

10. The imaging-based bar code reader of claim 9 wherein the first fold mirror directs the first and second fields of view through the window.

11. The imaging-based bar code reader of claim 8 wherein an optical axis of the first camera assembly is substantially aligned with an optical axis of the second camera assembly.

12. The imaging-based bar code reader of claim 8 wherein the first camera assembly is mounted to a first printed circuit board and the second camera assembly is disposed such that an optical axis of the first camera assembly is at an acute angle with respect to an optical axis of the second camera assembly, the first and second fields of view intersecting the first fold mirror.

13. The imaging-based bar code reader of claim 8 further including a second fold mirror positioned to intersect one of the first and second fields of view and direct the one of the first and second fields of view to intersect the first fold mirror.

14. The imaging-based bar code reader of claim 8 wherein the first camera assembly is mounted to a first printed circuit board and the second camera assembly is mounted to a second printed circuit board, an optical axis of the first camera assembly being substantially orthogonal to an optical axis of the second camera assembly.

15. The imaging-based bar code reader of claim 8 further including an illumination system having first and second illumination assemblies, the first illumination assembly being selectively actuated with the first camera assembly and the second illumination assembly being selectively actuated with the second camera assembly.

16. The imaging-based bar code reader of claim 15 wherein a range of wavelengths of illumination generated by the first illumination assembly is different than a range of wavelengths of illumination generated by the second illumination assembly.

17. The imaging-based bar code reader of claim 8 including a switch actuatable to indicate when the reader is being used in a hands-free mode and when the reader is being used in a hand-held mode, the imaging system selectively actuating the first and second camera assemblies based on the mode in which the reader is being used.

18. An imaging system for an imaging-based bar code reader having a housing and a window, the imaging system comprising:
   dual camera assembly means including a first camera assembly means for imaging a target bar code swiped through a first field of view; and
   a second camera assembly means for high resolution imaging of a target bar code comprising a high density two dimensional bar code positioned in a second field of view; and
   reflecting and directing means to intersect and direct the first and second fields of view such that the first and second fields of view pass through the window and are substantially congruent exterior of the housing.

19. A method of imaging a target bar code, the steps of the method comprising:
   providing an imaging system including a dual camera assembly including a first camera assembly and a second camera assembly mounted within a housing and selectively actuated for imaging, the first camera assembly including a first field of view and the second camera assembly including a second field of view;
   the imaging system further including a fold mirror and positioned within the housing to intersect and direct the field of view of at least one of the first and second camera assemblies such that the first and second fields of view pass through the exit window and are substantially congruent exterior of the housing;
   the first camera assembly including a two dimensional sensor array having a global shutter pixel structure for imaging a target bar code swiped through the first field of view; and
   the second camera assembly including a two dimensional sensor array adapted for high resolution imaging of a target bar code comprising a high density two dimensional bar code positioned in the second field of view; and
   energizing a selected one of the first and second camera assemblies and imaging a target bar code.

* * * * *